US010848421B2

(12) United States Patent
Osborne

(10) Patent No.: US 10,848,421 B2
(45) Date of Patent: Nov. 24, 2020

(54) INTERNET SERVICE THROUGH A VIRTUAL ROUTING AND FORWARDING TABLE OF A MULTIPROTOCOL LABEL SWITCHING NETWORK

(71) Applicant: Level 3 Communications, LLC, Broomfield, CO (US)

(72) Inventor: Eric Osborne, Sutton, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 16/019,191

(22) Filed: Jun. 26, 2018

(65) Prior Publication Data

US 2018/0375765 A1 Dec. 27, 2018

Related U.S. Application Data

(60) Provisional application No. 62/525,318, filed on Jun. 27, 2017.

(51) Int. Cl.
| | |
|---|---|
| *H04L 12/00* | (2006.01) |
| *H04L 12/741* | (2013.01) |
| *H04L 12/46* | (2006.01) |
| *H04L 12/781* | (2013.01) |
| *H04L 12/723* | (2013.01) |
| *H04L 29/06* | (2006.01) |

(52) U.S. Cl.
CPC .......... *H04L 45/74* (2013.01); *H04L 12/4641* (2013.01); *H04L 45/50* (2013.01); *H04L 45/52* (2013.01); *H04L 63/0272* (2013.01)

(58) Field of Classification Search
CPC ......... H04L 45/16; H04L 45/02; H04L 45/50; H04L 12/464; H04L 45/52; H04L 45/74
See application file for complete search history.

(56) References Cited

U.S. PATENT DOCUMENTS

| | | | |
|---|---|---|---|
| 7,715,381 B2 * | 5/2010 | Shen | H04L 12/4679 370/389 |
| 8,787,400 B1 * | 7/2014 | Barth | H04L 45/24 370/419 |
| 9,100,213 B1 * | 8/2015 | Ramanathan | H04L 45/66 |
| 9,596,167 B1 * | 3/2017 | Jacob | H04L 12/4641 |
| 10,277,499 B2 * | 4/2019 | Ferguson | H04L 12/4625 |
| 2003/0043802 A1 * | 3/2003 | Yazaki | H04L 29/06 370/389 |

(Continued)

*Primary Examiner* — Phuc H Tran

(57) ABSTRACT

Aspects of the present disclosure involve systems and methods for providing Internet access to customers of a telecommunications network through virtual routing and forwarding tables. An edge device includes both a first interface and a second interface. Traffic is received from a first network at the first interface of the edge device, the first interface being associated with a first virtual routing and forwarding table defining a first route to a destination network. Traffic from a second network is received at the second interface of the edge device, the second interface being associated with a second virtual routing and forwarding table defining a second route to the destination network. Access from the first interface to the destination network in accordance with the first route is provided, and access from the second interface to the destination network in accordance with the second route is provided, where the second route is distinct from the first route.

20 Claims, 4 Drawing Sheets

(56) References Cited

U.S. PATENT DOCUMENTS

2005/0068968 A1* 3/2005 Ovadia .................. H04L 45/04
370/396
2006/0250964 A1* 11/2006 Vasseur .................. H04L 45/10
370/238
2018/0227212 A1* 8/2018 Ferguson ............ H04L 12/4625

* cited by examiner

INTERNET SERVICE THROUGH A VIRTUAL ROUTING AND FORWARDING TABLE OF A MULTIPROTOCOL LABEL SWITCHING NETWORK

CROSS-REFERENCE TO RELATED APPLICATIONS

This application is related to and claims priority under 35 U.S.C. § 119(e) from U.S. Patent Application No. 62/525,318, filed Jun. 27, 2017, titled "INTERNET SERVICE THROUGH A VIRTUAL ROUTING AND FORWARDING TABLE OF A MULTIPROTOCOL LABEL SWITCHING NETWORK," the entire content of which is incorporated herein by reference for all purposes.

TECHNICAL FIELD

Disclosed herein are systems and methods for implementing a telecommunications network, and more specifically for utilizing a Multiprotocol Label Switching (MPLS) Virtual Private Network (VPN) to provide Internet Service to a customer of the telecommunications network.

BACKGROUND

Conventionally, the routing of communication packets related to providing access to the Internet includes a global routing table stored at each routing device of the network. Internet-bound packets which arrive on a router destined to the same destination (identified by a prefix of the communication) can be sent to the same network exit point or egress device. Packets to the same destination have their route lookup done against the same routing table, regardless of from whom the packets are received.

However, in some instances it is desirable to provide different exit points to different customers or peers on the same destination network, based on the interface on which their packets were received. For example, this can provide different views of the Internet to different customers on the same router, or can reduce costs based on choosing better geographically positioned exit points. However, because each device of the network utilizes the same routing table, different exit points cannot be provided. Devices, systems, and methods are therefore needed to provide different exit points for different customers or peer networks entering a network through the same router.

SUMMARY

Aspects of the present disclosure involve systems and methods for providing Internet access to customers of a telecommunications network through virtual routing and forwarding tables. An edge device includes both a first interface and a second interface. Traffic is received from a first network at the first interface of the edge device, where the first interface is associated with a first virtual routing and forwarding table defining a first route to a destination network. Traffic from a second network is received at the second interface of the edge device, where the second interface is associated with a second virtual routing and forwarding table defining a second route to the destination network. Access from the first interface to the destination network in accordance with the first route is provided, and access from the second interface to the destination network in accordance with the second route is provided, where the second route is distinct from the first route.

DETAILED DESCRIPTION

Aspects of the present disclosure involve systems, methods, computer program products, and the like, for providing telecommunication services, such as Internet access, private network access, or other network access, to customers of a telecommunications network through a Virtual Routing and Forwarding (VRF) table. In some embodiments, the telecommunications network may provide a network, such as a Multiprotocol Label Switching (MPLS) Virtual Private Network (VPN), to route received communication packets. In some instances, a network operator may desire to provide different exit points from the network for different customers or peer networks entering the network through the same router or ingress device. Conventionally, the ingress router includes a single routing table for routing received communications. However, each interface to the ingress router in the network may be paired with a VRF that is particular to the interface (or may be associated with a global routing table if a unique VRF for the interface is not desired). In this manner, different exit points or egress devices from the network may be sold or provided to different customers on a single ingress device. Further, the different exit points may be determined for the various customers of the ingress device based on one or more business decisions, such as a cost or transmission time associated with a particular route through the network. Further, the VRF tables for the various interfaces of the ingress device may be utilized for any number of services offered by the telecommunications network, such as Internet access or connection to a particular peer network. This network configuration therefore provides greater flexibility in the services provided and performance of the telecommunications network.

Figure 1:
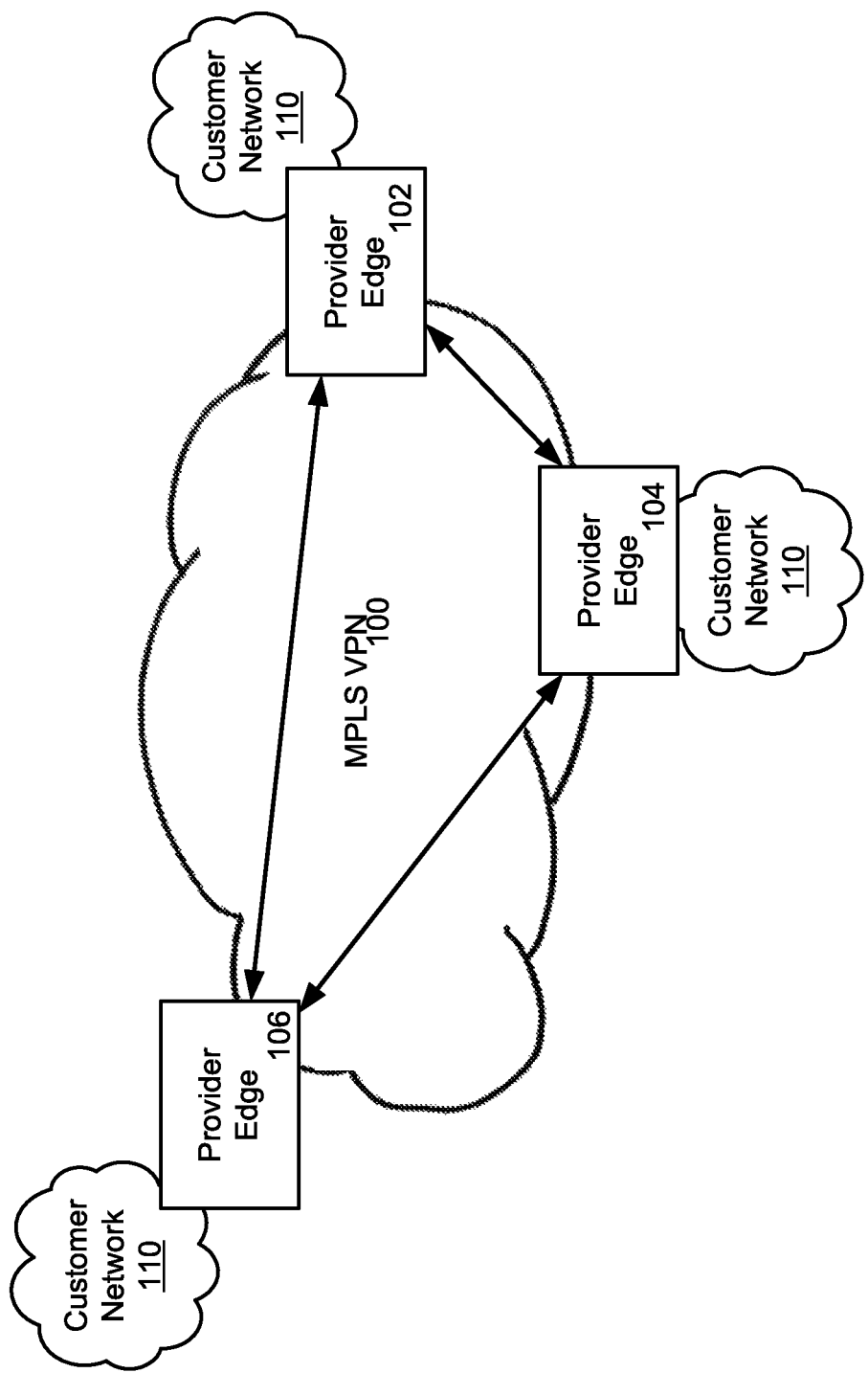
FIG. 1 is a schematic diagram illustrating an exemplary network environment in accordance with one embodiment.

A network can be an exemplary operating environment 100 for implementing and utilizing one or more VRF tables. For example, an MPLS VPN network can deliver telecommunication services through the network in accordance with the VRF tables. FIG. 1 is a schematic diagram illustrating an exemplary MPLS VPN 100 in accordance with one embodiment. The MPLS VPN 100 may utilize MPLS routing techniques and/or VPN routing techniques within the network to route communications or data packets to customers in communication with the network.

As illustrated, the MPLS VPN 100 of FIG. 1 includes one or more provider edge devices 102-106. MPLS VPN 100 provides a different routing technique for the network than simply providing a routing table to every component 102-106 that lists all destination Internet Protocol (IP) addresses supported by the network and an egress device of the network through which the destination devices may be reached. Based on the destination IP address included in the received communication, the provider edge 102 can apply, for example, an MPLS label to the communication to send traffic to an egress provider edge 104-106 in MPLS VPN 100.

In one particular embodiment, the provider edge 102 may include a segment ID label to a received packet that identifies a particular provider edge device 106 and is known to connect to a destination device for the packet. For example, the segment ID label may include a segment ID of "1003" associated by the provider edge 102 to the particular egress edge device 106. Further, the egress edge device (e.g., provider edge 106) may or may not be in direct communication with the provider edge 102, depending on the configuration of MPLS VPN 100. Thus, packets intended for the provider edge 106 may be received and routed by one or more intermediary devices. For example, provider edge 104 may receive the packet for provider edge 106. In response, provider edge 104 may analyze the packet, determine the segment label ID included in the packet, and route the packet to the intended provider edge 106 or further down the routing chain to the intended egress device. In this manner, nodes or devices within MPLS VPN 100 route packets based on the short label rather than based on a longer IP address of the packet. Through the label routing technique, the devices (provider edge 102-106) may avoid more complex routing based on an IP destination address to improve the functioning of the network routing system. Other advantages, such as those described below, may be gained through the use of an MPLS configuration and routing scheme in MPLS VPN 100.

Figure 2:
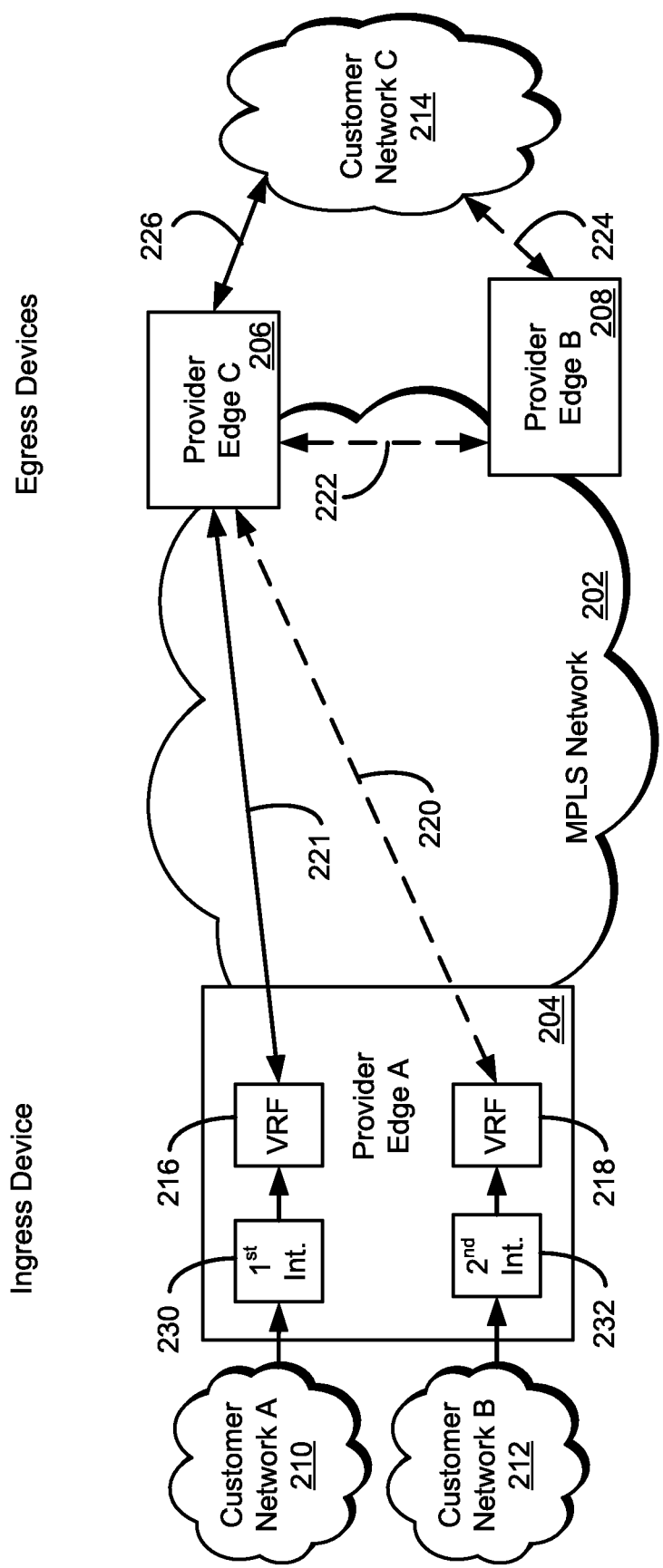
FIG. 2 is an exemplary network illustrating providing a service to a user of the network through a Virtual Routing and Forwarding (VRF) table.

One advantage gained from the use of networks (and in particular MPLS VPN configurations) is the employment of VRF tables to provide separate routing tables in a provider edge 102 based on an interface of the edge device through which a packet is received. For example, FIG. 2 illustrates an MPLS Network 202 to provide a telecommunications service to a user of the network through a VRF. The MPLS VPN 202 may be a part of a telecommunications network (e.g., MPLS VPN 100) described above with reference to FIG. 1 such that provider edges 204-208 may be similar to the provider edges also described above. Through the network environment 200 illustrated in FIG. 2, Internet access may be provided to a customer to the network through the use of a VRF 216 at provider edge 204 while packets from other customers connected to the same provider edge may be routed differently based on another VRF 218 associated with a separate interface of the provider edge device. The different routing of the received packets based on the VRFs associated with the interfaces to the provider edge 204 may be based on one or more business rules for an operator of the MPLS Network 202, as described in more detail below.

As shown in FIG. 2, the MPLS network 202 includes three provider edge devices, namely provider edge A (PE-A) device 204, provider edge B (PE-B) device 206, and provider edge C (PE-C) device 208. It should be appreciated that any number of networking devices may be included in the MPLS network 202, and PE-A through PE-C 204-208 are shown here merely as an example. The provider edge devices 204-208 may be configured to receive and transmit communication packets to connected networks, such as customer network A 210 (CN-A), customer network B 212 (CN-B), and customer network C 214 (CN-C), although any number of customer networks or peer networks may be connected to the MPLS network 202. Further, customer networks, such as CN-C 214, may connect to one or more provider edges 206, 208 to access MPLS network 202. In some embodiments, customer networks may host or otherwise provide access to one or more storage servers or other computing devices that provide data to a user device through an Internet browser operating on the user's device. For example, CN-C 214 may provide access to one or more Internet servers that provide data to users of the MPLS 202 upon a request from a browser or other Internet-related program executed on the user's device.

In addition, more than one customer or customer network may connect to a single provider edge device 204. For example, CN-A 210 and CN-B 212 can access MPLS network 202 through PE-A 204 (although other connections to the MPLS network from those customer networks may also be present). In general, PE-A 204 may include more than one interface through which customers or customer networks may connect to PE-A. Thus, CN-A 210 may connect to PE-A 204 through a first interface 230 while CN-B 212 may connect to PE-A through a second interface 232. Also, for each incoming interface, PE-A 204 may have an associated VRF table 216,218 for routing received packets within the MPLS network 202. That is, each incoming interface to the MPLS network 202 may have an associated VRF table such that routes through the MPLS network may vary from interface to interface, even for those packets that have the same destination or egress network device. In other embodiments, interfaces of PE devices 204-208 of the network 302 may share VRF tables, sometimes referred to herein as "global" VRF tables.

The VRF tables 216,218 for the PE devices 204-208 of the MPLS network 202 may be created by the network or devices based on routing information received at the network. For example, each customer network 210-214 connected to the MPLS network 202 may provide or announce particular IP address prefixes that can be reached through the respective customer network. Thus, CN-C 214 may support or host one or more networking devices that are identifiable by particular IP addresses. Thus, packets intended for those networking devices may be provided to CN-C 214 for termination at the supported or hosted devices. As such, CN-C 214 may announce the particular IP addresses for the networking devices that are reachable through CN-C.

With the announced information, the PE devices 204-208 of the MPLS network 202 may create a VRF table that indicates an egress device out of the network for each of the announced prefixes. In other words, PE-A 204 may know, based on the announced supported prefixes from CN-C 214, that packets with a destination IP address that match the announced prefixes of CN-C may be transmitted to CN-C for termination at the destination device. Further, PE-C 206 and PE-B 208 may also announce that CN-C 214 may be reached through them such that packets with a matching IP address of the announced CN-C prefixes may be routed to PE-B 208 or PE-C 206 for connection to CN-C. Further, one or more business decisions may be implemented within the VRF tables of any of the PE devices 204-208 to further determine which of the egress devices (PE-B 208 or PE-C 206) is chosen as the preferred egress route to CN-C 214 by the MPLS network 202. These business rules may be built into the VRF tables of the MPLS network 202 to facilitate execution of those business decisions.

For example, PE-A 204 may create a VRF table 218 paired with second interface 232 to route incoming packets received from CN-B 212. The VRF table 218 may be created from announced routing information from CN-C 214 (and other networks connected to the MPLS network 202) as well as announced routing information from devices within the MPLS network. Further, although two egress routes to CN-C 214 are announced (namely from PE-C 206 and PE-B 208), the VRF 218 may only include one route to reach CN-C 214 for packets intended for CN-C. For example, only PE-B 208 may be included in the VRF 218 as an egress device for packets intended for CN-C 214, even if the route takes the packet through PE-C 206 (as shown in dashed transmission lines 220-222). The selection of PE-B 208 as the egress device to CN-C 214 may be included in the VRF table 218 because of a business reason of an operator of the MPLS network 202. For example, CN-C 214 may charge the MPLS network 202 more money to connect through PE-C 206 than through PE-B 208. In another example, PE-B 208 may be geographically closer to CN-C 214 such that routing through PE-B may provide a faster transmission to CN-C. Regardless of the business reason for selecting a particular egress device 208 to CN-C 214 from the MPLS 202, such a selection may be included in the VRF table 218 of PE-A 304 for packets intended for CN-C.

In some instances, however, the MPLS network 202 may take advantage of the alternate route or egress device to transmit packets to CN-C 214. For example, the MPLS network 202 of FIG. 2 includes two routes to CN-C 214, egress route 224 from PE-B 208 and egress route 226 from PE-C 206. However, egress route 226 from PE-C 206 may be more expensive to an operator of the MPLS network 202 to transmit packets to CN-C 214. This cost may be based on one more service or business agreements between an operator of the MPLS network 202 and an operator of CN-C 214. In such a circumstance, the operator of the MPLS network 202 may determine that packets intended for CN-C 214 be routed to egress route 224 from PE-B 208. Thus, packets received at PE-A 204 may be routed along default route 220 to PE-C 206, then along default route 222 to PE-B 208, before exiting the MPLS network 202 along egress route 224 from PE-B to CN-C 214. In other embodiments, the packets may not be routed through PE-C 206 before reaching PE-B 208. Rather, the packets may be routed through the MPLS network 202 in any manner determined by the label routing scheme implemented within the MPLS network. The default routes 220,222 are illustrated in FIG. 2 as an example default route for packets received at the MPLS 202 to CN-C 214.

As should be appreciated, default routes 220,222 for packets intended for CN-C 214 from CN-A 210 or CN-B 212 received at PE-A 204 may take longer to reach the destination device within or behind CN-C. Thus, some customers to the MPLS network 202 may prefer to pay an extra fee to reach CN-C 214 faster during a provided Internet service access by the customer. In previous MPLS network 202 configurations, such alternate routing may not have been available to particular customers of the MPLS network as each edge device 204-208 within the network utilizes the same routing table. However, through the use of different VRF tables for different interfaces of a provider edge device 204, the alternate egress route 226 may be made available to a particular customer to the network 202, such as CN-A 210. In other words, an operator of the MPLS network 202 may offer a faster Internet access service to particular customers of the network at a premium price. Certain customers may be willing to pay additional fees to receive a faster Internet access along egress route 226 from PE-C 206, bypassing the default route 222 through PE-B 208 and egress route 224 to CN-C.

To facilitate alternate routes to CN-C 214, the MPLS network 202 (and in particular, PE-A 204) may create and provide different VRF tables to different interfaces into the network. For example, CN-A 210 may elect to utilize the alternate egress route 226 to CN-C 214 while CN-B 212 (also connected to MPLS network 202 through PE-A 204) may elect to utilize the slower default egress route 224 through PE-B 208. CN-A 210 connects to PE-A 204 through a first interface 230 while CN-B 312 connects to PE-A through a second interface 232. PE-A 204 may therefore create and apply a first VRF table 216 for packets received from CN-A 210 through the first interface 230 and create and apply a second VRF table 218 for packets received from CN-B 212 through the second interface 232. Other interfaces of PE-A 204 may also be associated with other VRF tables or may be associated with the first VRF table 216 or the second VRF table 218. In other words, the VRF tables of PE-A 204 may be associated with one or more interfaces. In one particular embodiment, PE-A 204 may include a default or global VRF table that is applied to the second interface 232 and only those interfaces or customers that desire an alternate egress route different from the default routes are provided with an individual VRF table. Further, although discussed herein with relation to different egress routes 224,226 from the network 202, it should be appreciated that the VRF tables may also include alternate routes internal to the MPLS network 202 (such as bypassing PE-C 206 to reach PE-B 208 and the like). Also, any of the provider edge devices 204-208 or any other network device of the MPLS network 202 may have different VRF tables 216,218 for different interfaces into the respective edge devices to provide an alternate service path for any customer to the network Through the different VRF tables 216,218 applied to the devices of the MPLS VPN network 202, alternate service paths may be provided to customers that request such paths. In one particular embodiment, an alternate path for providing Internet access to a customer may be utilized based on a VRF table of an edge device 204. In one example, the customer-specific or individual VRF table may be a subset or superset of a global routing table that provides the alternate routing path for the customer for that particular service provided through the MPLS network 202. Such an alternate path may be provided to the requesting customer at one interface or many interfaces into the MPLS network 202. For example, CN-A 210 may connect to MPLS network 202 through PE-A 204 and PE-B 206. Once the alternate egress route 226 is purchased, a resulting VRF table may be applied at both PE-A 204 and PE-B 206 for the interfaces utilized by that customer's network. In this manner, alternate egress or internal routing may be made available to any customer's interface into the MPLS network 202 through the use of individual or unique VRF tables applied at the edge devices 204-208 of the network. Further still, alternate routing may be made available for particular services provided to the customer network while other services retain the global or default routing. Thus, the application of a VRF table to an interface to the network 202 may be customer specific, service specific, destination device specific, or any combination thereof.

Figure 3:
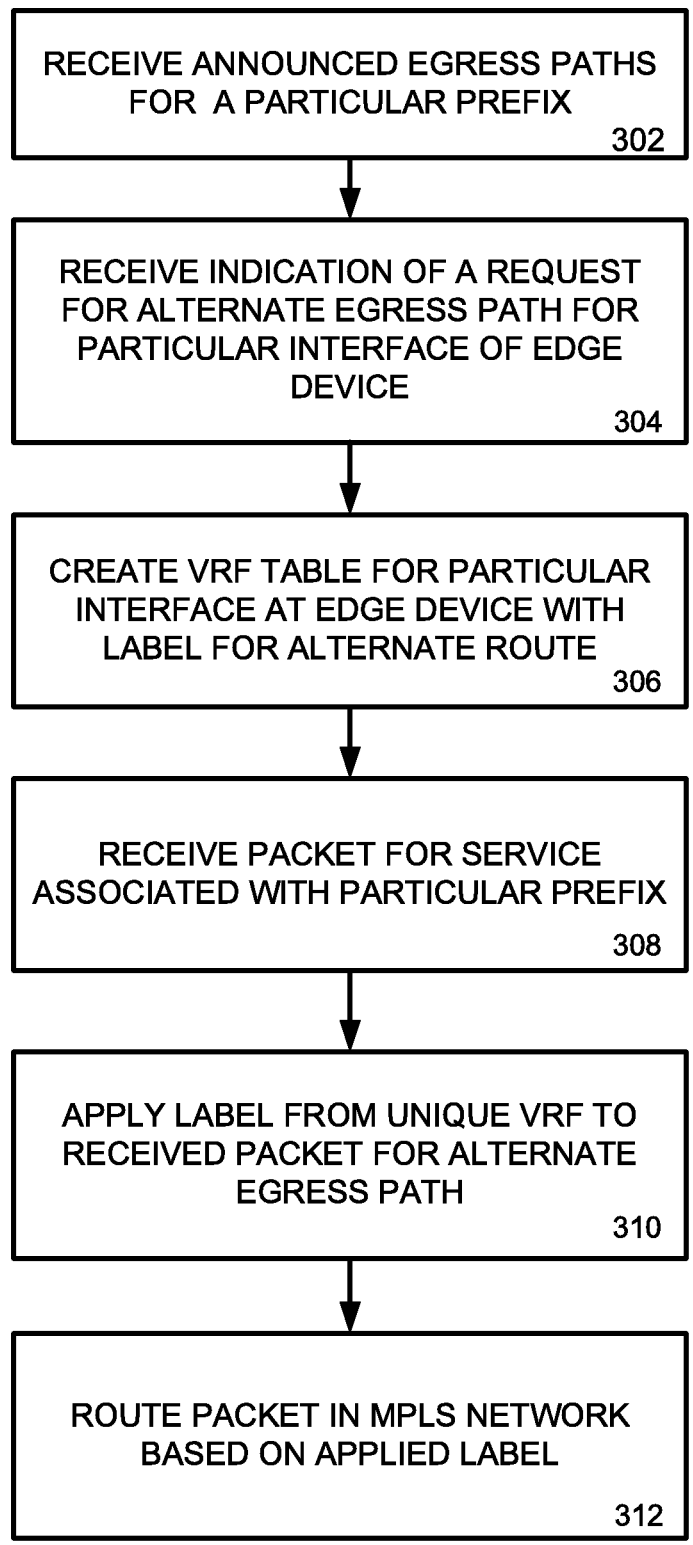
FIG. 3 is a flowchart illustrating a method for provisioning a service in a network utilizing a VRF table.

FIG. 3 is a flowchart illustrating a method for provisioning a service in a VPN utilizing a VRF table. In general, the operations of the method 300 may be performed by an edge device (such as PE-A 204) of the VPN 202, although the operations may be performed by any networking or computing device associated with the network. Through the method 300, a provider edge 204 may provide an alternate Internet service path for a customer to the network through the use of a VRF table associated with an interface the customer utilizes in the provider edge 204 to access the MPLS Network 202.

Beginning in operation 302, the provider edge 204 may receive announced egress routes for a particular prefix or group of IP addresses. As explained above, customer networks 214 connected to the MPLS network may announce IP addresses or prefixes supported by the customer network. Utilizing the network environment of FIG. 2, these announcements are received at PE-C 206 and PE-B 208 of the MPLS network 202. PE-C 206 and PE-B 208 may similarly announce to PE-A 204 that packets intended for the IP announced IP addresses or prefixes may be transmitted to CN-C 214 through those edge devices. As such, PE-A 204 receives a specific route from a couple potential routes to CN-C 214 for prefixes that match the announced supported IP addresses or prefixes. As explained further below, the routes 221, 220 may be included in one or more routing tables, such as a VRF table, associated with interfaces of the provider edge 230, 232. In one particular embodiment, a global VRF table 218 for each interface to the provider edge 204 may be created through one of the announced routes 221, 220 included in the table, such as a network-preferred default route to reach CN-C 214.

In operation 304, the provider edge 204 receives an indication to provide a route 221 for a particular prefix (associated with CN-C 214) to a particular interface of the provider edge or customer network 210 connected to the provider edge through the particular interface (e.g., interface 230). The indication of the route 221 for the particular customer network (CN-A 210) may be based on a purchase agreement for the route between the customer network and an operator of the MPLS Network 202. In operation 306, the provider edge 204 or other networking device may create a VRF table 216 specifically for the interface 230 of the customer network 210. As mentioned, the VRF table 216 provides routing information for packets received at the provider edge 204. In one particular embodiment, the VRF table 216 may include an MPLS label associated with the egress device 206 of the route 221 to CN-C 214. The created VRF table 216 for the first interface of PE-A 204 may be a subset of a larger, global VRF table of PE-A that provides default routes for other received packets for PE-A. In this manner, the created VRF table 216 may supplant the default VRF table 218 for routes received over the first interface intended for CN-C 214.

Once the VRF table 216 with the alternate route is provided, PE-A 204 may receive a data packet for a service that is associated with the particular prefix announced by CN-C 214. For example, PE-A 204 may receive a packet related to an Internet access service provided by MPLS Network 202 for CN-A 210. The received packet may include a destination IP address that matches the prefixes announced by the CN-C 214 such that PE-A 204 is aware that the packet may be transmitted to CN-C 214 along egress route 221. PE-A 204 is aware of route 221 through a lookup in VRF table 216 that includes an indication of the prefix and a MPLS label that may be applied to the packet in operation 310. With the MPLS label applied to the packet, PE-A 204 may then transmit the received packet to PE-C 206 of the MPLS Network 202 to egress routing 226 to CN-C 214 in operation 312. In this manner, Internet service may be provided to CN-A 210 along route 221 based on a created VRF table 216 that includes the egress route that is different than a default egress route to CN-C 214 through PE-C2 208. In other embodiments, different telecommunication services may be to provide to CN-A 210 in a similar manner through the use of specific VRF tables for one or more interfaces to a provider edge device of the MPLS network 202.

Figure 4:
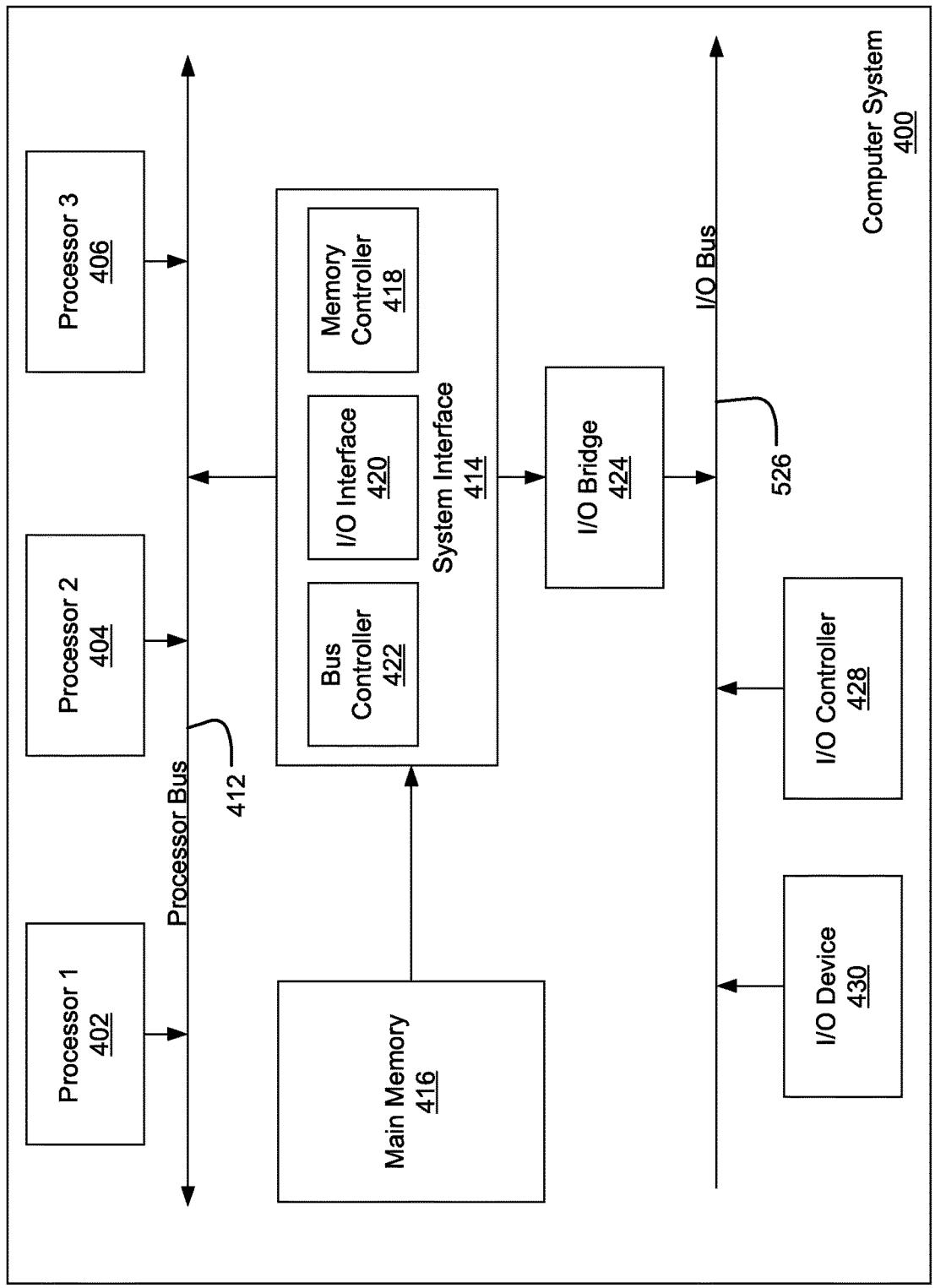
FIG. 4 is a diagram illustrating an example of a computing system which may be used in implementing embodiments of the present disclosure.

FIG. 4 is a block diagram illustrating an example of a computing device or computer system 400 which may be used in implementing the embodiments of the components of the network disclosed above. For example, the computing system 400 of FIG. 4 may be the provider edge 204 or any other networking device of the MPLS network 202 discussed above. The computer system (system 400) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated. The system interface 414 may further include a bus controller 422 to interact with processor bus 412 and/or I/O bus 426.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

I claim:

1. A method for providing a service from a network, the method comprising:
   determining a plurality of interfaces of an edge device, wherein the plurality of interfaces include a first interface and a second interface;
   determining, based on the first interface's type, a first virtual routing and forwarding table, wherein the first virtual routing and forwarding table defines a first plurality of routes to a particular destination network;
   determining, based on the second interface's type, a second virtual routing and forwarding table, wherein the second virtual routing and forwarding table defines a second plurality of routes to the particular destination network, and wherein the first virtual routing and forwarding table is different from the second virtual routing and forwarding table;
   receiving, at the first interface of the edge device, traffic from a first network;
   receiving, at the second interface of the edge device, traffic from a second network;
   providing access from the first interface to the destination network using a first route retrieved from the first virtual routing and forwarding table; and
   providing access from the second interface to the destination network in accordance with a second route retrieved from the second virtual routing and forwarding table, wherein the second route is distinct from the first route.

2. The method of claim 1, further comprising:
   generating an entry in the first virtual routing and forwarding table, the entry in the first virtual routing and forwarding table comprising a particular label associated with the first route;
   wherein from the first interface to the destination network is based on the first virtual routing and forwarding table.

3. The method of claim 1, wherein the first route is different than a default route from the first interface to the destination network.

4. The method of claim 1, wherein determining the first virtual routing and forwarding table is further based on at least one of a cost or a transmission time associated with the first route.

5. The method of claim 1, wherein the edge device is a router.

6. The method of claim 1, further comprising:
   based on the second interface specifying the second route and the second route being different from a default route, applying the second virtual routing and forwarding table to the second interface of the edge device instead of a global virtual routing and forwarding table.

7. The method of claim 1, wherein the destination network provides access to the Internet.

8. A network routing system comprising:
   a first egress edge device;
   a second egress edge device; and
   a first ingress edge device comprising:
      at least one hardware processor; and
      memory comprising instructions that, when executed by the at least one hardware processor, cause the network routing system to:
         determine a plurality of interfaces of an edge device, wherein the plurality of interfaces include a first interface and a second interface;
         determine, based on the first interface's type, a first virtual routing and forwarding table, wherein the first virtual routing and forwarding table defines a first plurality of routes to a particular destination network;
         determine, based on the second interface's type, a second virtual routing and forwarding table, wherein the second virtual routing and forwarding table defines a second plurality of routes to the particular destination network, and wherein the first virtual routing and forwarding table is different from the second virtual routing and forwarding table;

receive traffic from a first network at the first interface using a first route for traffic from the first network to a destination network by way of the first egress edge device; and receive traffic from a second network at the second interface using a second route for traffic from the second network to the destination network by way of the second egress edge device, wherein the second route is distinct from the first route.

9. The network routing system of claim 8, wherein the first route defines the first egress edge device for sending traffic to the destination network, and the second route defines the second egress edge device for sending traffic to the destination network, the second egress edge device being distinct from the first egress edge device.

10. The network routing system of claim 8, wherein the first egress edge device, the second egress edge device, and the first ingress edge device is a router.

11. The network routing system of claim 8, wherein the first network is associated with a first customer, and the second network is associated with a second customer.

12. The network routing system of claim 8, wherein the first virtual routing and forwarding table and the second virtual routing and forwarding table is associated with a global routing table.

13. The network routing system of claim 8, wherein the destination network provides access to the Internet.

14. A packet routing apparatus comprising:
a first interface of an edge device;
a second interface of the edge device;
at least one hardware processor; and
memory comprising instructions that, when executed by the at least one hardware processor, cause the packet routing apparatus to:
determine, based on the first interface's type, a first virtual routing and forwarding table, wherein the first virtual routing and forwarding table defines a first plurality of routes to a particular destination network; and determine, based on the second interface's type, a second virtual routing and forwarding table, wherein the second virtual routing and forwarding table defines a second plurality of routes to the particular destination network, and wherein the first virtual routing and forwarding table is different from the second virtual routing and forwarding table, wherein the first interface receives traffic from a first network and defines, by the first virtual routing and forwarding table, a first route to the particular destination network, and wherein the second interface receives traffic from a second network, and defines, by the second virtual routing and forwarding table, a second route to the particular destination network, wherein the second route is distinct from the first route.

15. The packet routing apparatus of claim 14, wherein the first route defines a first egress edge device for sending traffic to the destination network and the second route defines a second egress edge device distinct from the first egress edge device, for sending traffic to the destination network.

16. The packet routing apparatus of claim 14, wherein the edge device is a router.

17. The packet routing apparatus of claim 14, wherein the first network is associated with a first customer, and the second network is associated with a second customer.

18. The packet routing apparatus of claim 14, wherein the first virtual routing and forwarding table and the second virtual routing and forwarding table is associated with a global routing table.

19. The packet routing apparatus of claim 14, wherein generating an entry in the second virtual routing and forwarding table defines the second route being distinct from the first route.

20. The packet routing apparatus of claim 14, wherein the destination network provides access to the Internet.

* * * * *